United States Patent
Warner et al.

(10) Patent No.: US 7,289,949 B2
(45) Date of Patent: Oct. 30, 2007

(54) METHOD FOR ROUTING ELECTRONIC CORRESPONDENCE BASED ON THE LEVEL AND TYPE OF EMOTION CONTAINED THEREIN

(75) Inventors: Douglas K. Warner, Bozeman, MT (US); James Neal Richter, Bozeman, MT (US); Stephen D. Durbin, Bozeman, MT (US); Greg Gianforte, Bozeman, MT (US)

(73) Assignee: Right Now Technologies, Inc., Bozeman, MT (US)

( * ) Notice: Subject to any disclaimer, the term of this patent is extended or adjusted under 35 U.S.C. 154(b) by 0 days.

(21) Appl. No.: 10/266,180

(22) Filed: Oct. 7, 2002

(65) Prior Publication Data

US 2003/0069936 A1   Apr. 10, 2003

Related U.S. Application Data

(60) Provisional application No. 60/327,988, filed on Oct. 9, 2001.

(51) Int. Cl.
G06F 17/27 (2006.01)
(52) U.S. Cl. .......................................... 704/9
(58) Field of Classification Search ............... 704/1, 704/9, 10, 206, 203, 205; 707/530, 531, 707/532, 1, 5, 100; 379/93.15, 93.17, 89.2; 715/531, 530
See application file for complete search history.

(56) References Cited

U.S. PATENT DOCUMENTS

| | | | |
|---|---|---|---|
| 5,781,879 A | 7/1998 | Arnold et al. | |
| 5,794,050 A | 8/1998 | Dahlgren et al. | |
| 5,918,222 A | 6/1999 | Fukui et al. | |
| 6,128,646 A * | 10/2000 | Miloslavsky | 709/206 |
| 6,332,143 B1 | 12/2001 | Chase | |
| 6,339,774 B1 * | 1/2002 | Nakayama et al. | 707/10 |
| 6,356,633 B1 * | 3/2002 | Armstrong | 379/265.11 |
| 6,446,056 B1 * | 9/2002 | Sadakuni | 706/14 |
| 6,460,074 B1 | 10/2002 | Fishkin | |
| 2002/0087498 A1 * | 7/2002 | Yoshida | 706/45 |
| 2002/0091715 A1 * | 7/2002 | Coady | 707/200 |
| 2002/0111811 A1 * | 8/2002 | Bares et al. | 704/275 |
| 2003/0182123 A1 * | 9/2003 | Mitsuyoshi | 704/270 |

* cited by examiner

*Primary Examiner*—Richemond Dorvil
*Assistant Examiner*—Lamont Spooner
(74) *Attorney, Agent, or Firm*—Blackwell Sanders Peper Martin LLP

(57) ABSTRACT

A system, method, and computer program product for determining the emotional content of an electronic correspondence to route or prioritize the information, to set the expectations of a customer support worker, to flag those workers who are using inappropriate language with the customer, or to determine another best course to send the correspondence. In a preferred embodiment, a customer sends an electronic correspondence to a company via email. Emotionally charged words or symbols in each sentence are detected. The message is then given an emotional ranking which is used to determine what future action is most appropriate for the correspondence.

2 Claims, 4 Drawing Sheets

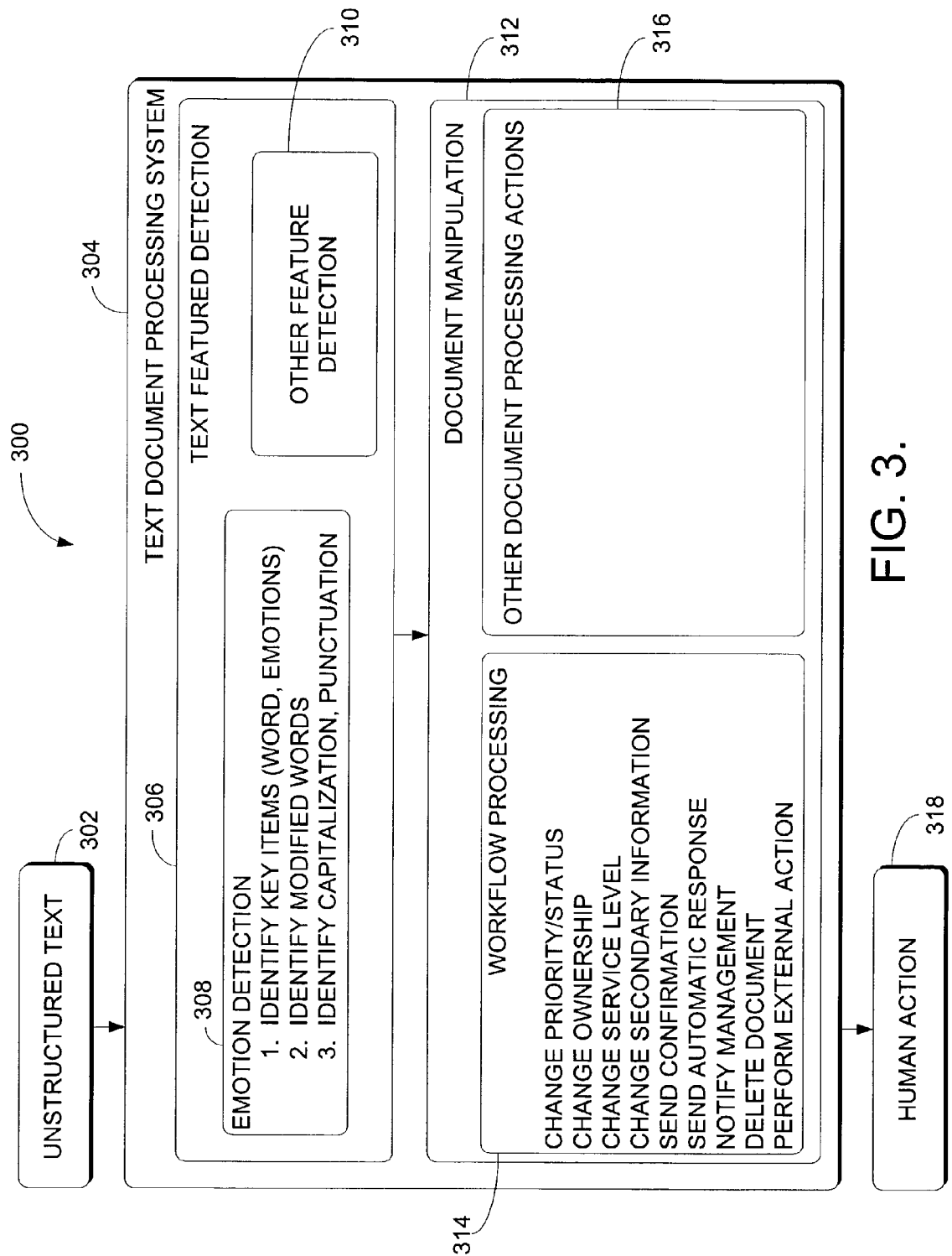

METHOD FOR ROUTING ELECTRONIC CORRESPONDENCE BASED ON THE LEVEL AND TYPE OF EMOTION CONTAINED THEREIN

CROSS REFERENCE TO RELATED APPLICATIONS

This application claims priority to U.S. Ser. No. 60/327,988, filed Oct. 9, 2001, which is fully incorporated herein by reference.

BACKGROUND ART

This invention relates to a variety of problems including the inefficient routing of electronic correspondence, such as electronic mail (email), sent from customers to a company.

Email has developed into a convenient medium for customers to provide feedback concerning a company's products and/or services. Customers are often more candid in their assessment of a company's products and services when spared a physical or even oral confrontation with a company representative. Large business entities are commonly inundated with either solicited or unsolicited email feedback. Adequately and efficiently processing this massive amount of data has typically been a time intensive and expensive process. An automatic method of routing email based on its emotional content would ease the burden on the company.

A company must employ some means to route its customers' electronic correspondence to appropriate personnel. A company may create a department to read each piece of email to determine the best route of the message, whether that be to a customer service representative (CSR), a CSR's supervisor, a public relations representative, normal routing, or other appropriate path. The time associated with physically reading each email compounded by the expense of maintaining such a department would make a company less nimble and responsive to consumer demands.

In another variation, customer e-mails can be summarized based on keywords. These summaries would reduce the amount of words that must be read, however the process is not automatic and important words can be left out of the summary. Having to read even the summaries is not an optimal use of a department's resources.

A CSR often relies on observing the physical demeanor of a customer to determine who is the best person to handle the situation. If a CSR receives a phone call from a disgruntled customer who speaks loudly and forcefully, that customer may be transferred directly to the CSR's supervisor to more adequately address the customer's concerns. Unfortunately, a CSR cannot observe the physical demeanor of a customer who sends an email. Stripped of this emotional gauge, a company must allocate substantial resources to route customer concerns.

Eudora 5.1's Moodwatch™, which was created by Qualcomm Incorporated, a Delaware corporation, is an application that classifies documents based on the document contents. More specifically, MoodWatch™ is a new language tool that acts as an emotion monitor for email that flags aggressive language and calls it to the author's attention. MoodWatch™ can detect aggressive, demeaning or rude language in the email by looking at both individual words and complete phrases. However, MoodWatch is used only to warn or alert a person of potentially offensive messages. It makes no decisions based on its alerts and does not gauge positive messaging.

In summary, the prior art provides means to manually read email and then manually determine the best person or department to act on the email. Means also exist to electronically gauge the offensiveness of email content. This art can be improved by a system that gauges both positive and negative emotion within email and then uses that determination to automatically route the email message to an appropriate company representative. Workflow routing based on the detected emotion enables a company to provide a high level of service to its customers in a more cost efficient and less time intensive manner.

SUMMARY OF THE INVENTION

The foregoing problems are overcome by the present invention. In one aspect of the invention, both positive and negative emotions are determined in a customer's incoming email. This process is language independent. First, a speech tagger designates each word as an adjective, noun, verb, adverb, etc. Thereafter, a language parser identifies noun phrases and verb phrases and other relevant features of the language. Each word and phrase is then assigned an emotion value. Next, a fuzzy logic mapper applies transformation rules to assign an emotional ranking to the email message. Finally, the emotional ranking is used to determine what future actions are most appropriate for the correspondence. These actions include, but are not limited to, routing the email to an appropriate person or to an automatic responder, setting a priority on the message, ignoring the message, or completing some other action such as appending associated information or sending a conformation to the sender. Reports may also be generated based on the ratings.

BRIEF DESCRIPTION OF THE DRAWING

The present invention is described in detail below with reference to the attached drawing figures, wherein:

FIG. 3 is an overview of the component parts of an embodiment of the present invention.

DETAILED DESCRIPTION OF THE INVENTION

The present invention provides a method and system for routing electronic correspondence based on the emotional content of the correspondence.

For illustrative purposes, an embodiment of the present invention is discussed below with reference to a company customer support department that accepts email as a means of customer communication. This is only one example of a suitable environment and is not intended to suggest any limitation as to the scope of use or functionality of the invention. Neither should it be interpreted as having any dependency or requirement relating to any one or a combination of components illustrated in the exemplary operating environment.

Figure 1:
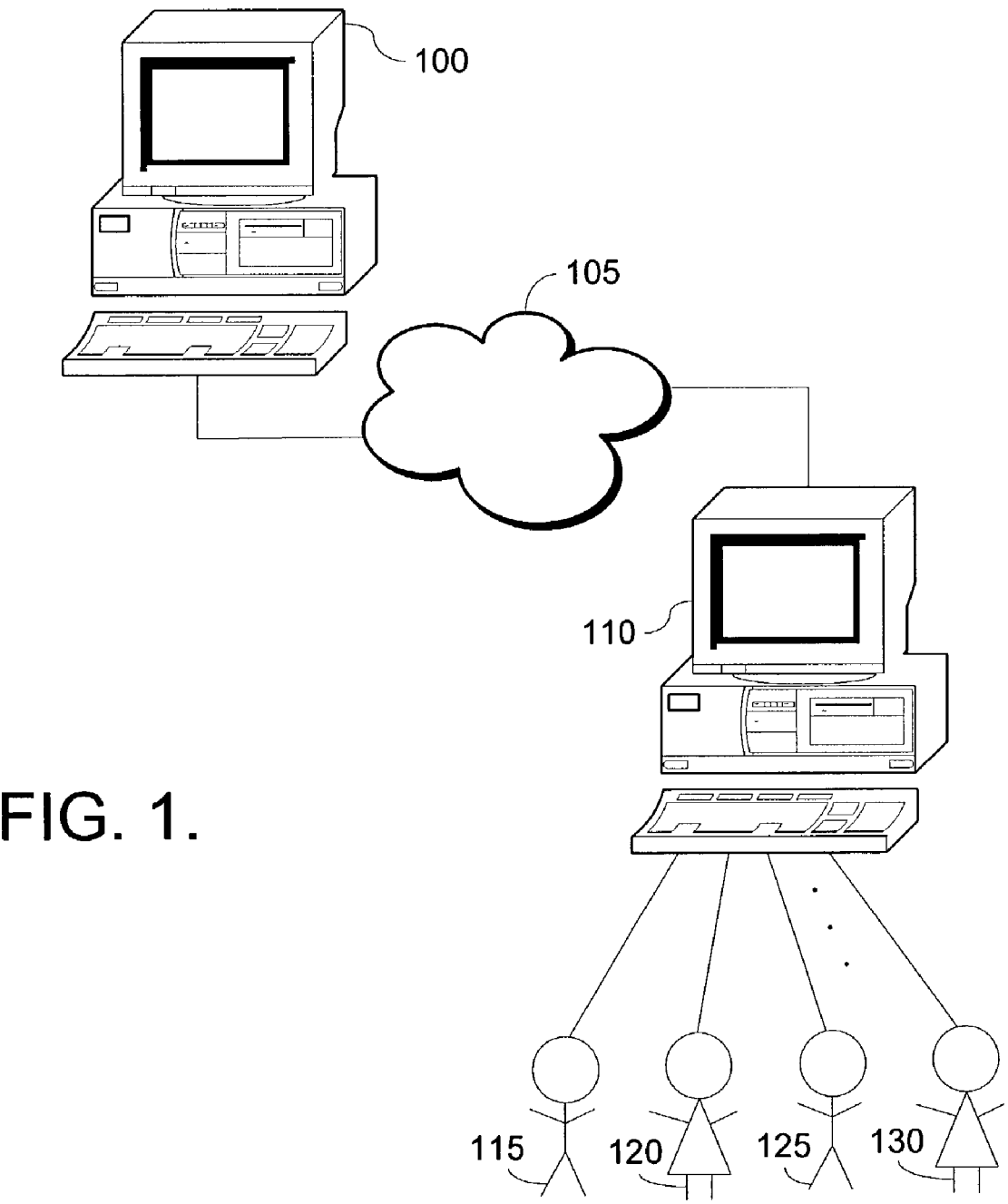
FIG. 1 depicts the overall architecture of an embodiment of the present invention comprising a customer's computer and a company's servers connected via a data network.

Referring to the drawings, FIG. 1 illustrates one embodiment of the invention. A company receives and transmits customer electronic correspondence including email from an email server 110 via a data network 105 connected to a customer's computer 100. In a preferred embodiment, the data network 105 can be the Internet. Electronic correspondence contemplates but is not limited to email, chat and web-based forms. The email server 110 is merely one of a myriad means a company may employ to send and receive email. The email server 110 may be individual workstations or a network of servers. Electronic correspondence received from a client computer 100 via the Internet 105 initiates the process of the present invention. The process of the present invention is illustrated and described with reference to FIGS. 2a and 2b.

As shown, an e-mail message is received at step 200. At step 203, the processing of the email message begins. Initially, at step 206, each word in the email message is tagged with its corresponding part-of-speech. A part-of-speech tagger assigns tags such as noun, verb, adjective, adverb, etc., to each word of the email message. Next, a language parser identifies noun phrases and verb phrases along with other relevant features of the language at step 209. The parser ensures that a phrase such as "not happy" carries the same meaning as the word "unhappy" and that negation operators such as "not" are prevented from mistakenly labeling irate customers as those that are quite pleased.

Next, individual words and word-phrases are referenced against a lookup table at step 212. The reference information is used to assign an emotion value to the individual words and word-phrases at step 215. Symbols within a message can also be given emotion values. For example, emotions which are punctuation strings such as :-) to denote happiness and :-( to denote sadness can be assigned an emotion value. In other words, emotions are symbols that the system may use also to determine an overall emotional ranking at step 224. At step 218, modifier words such as "very" are identified.

Further, capitalization, punctuation, and other features are detected at step 221. In a preferred embodiment, words that have all of their letters capitalized can signify yelling. Serial exclamation points can signify a forceful tone. Thus the system can recognize the difference in degree of emotion between someone writing "I am not very happy," and "I am NOT VERY HAPPY!!!"

A series of transformation rules are applied at step 222 to the email message contents. The transformation rules can include such things as associating a word and rating with the action of assigning a message to a particular individual. Alternately, transformation rules can involve the conversion of a word value from a scale of −100 to 100 to a scale of −3 to +3. In order to reduce non-linearity in ratings and to easily convey information to a user, a mapped emotional ranking is assigned to the message using a fuzzy logic mapper at step 224. Thus, a scale of between −100 and +100, or any derivative thereof, can be used but the emotional rankings are mapped in the range from −3 to +3, which makes graphically depicting relevant emotional information easier by having only seven levels of satisfaction to visually display. The fuzzy logic mapper can be used to account for a non-linear rating scale. For instance, if the marginal dissatisfaction from −90 to −100 is greater than the marginal dissatisfaction from zero to −10, the fuzzy logic mapper will properly map the larger values to smaller values and accurately assign an emotional ranking at step 224 to the message.

The workflow processing begins at step 227. Workflow processing is the process whereby the route of the electronic correspondence is determined based on the emotional metrics described above. Emotional content of the electronic correspondence is used to route or to prioritize the information, to set the expectations of a customer support worker, to flag those workers who are using inappropriate language with the customer, or to determine an alternate best course for the correspondence.

Initially, a determination is made whether to assign a new priority status at step 230. At step 223, a determination is made whether to assign new ownership to any one of the individuals within a company. An example of such individuals includes a customer service representative 120, supervisor 115, manager 125, or any other appropriate individual 130 as illustrated in FIG. 1. At step 236, a determination is made whether to assign a new service level and, at step 239, a determination is made whether to assign secondary information to the message. Next, at step 242, a confirmation can be sent to the user which may be prior to or in addition to a sending an auto-response at step 245. A determination is made on whether or not to notify a manager at step 247. Following workflow processing, the message can be deleted as shown at step 250 or preserved for future reference as shown at step 253. The outcome of all of the message processing and workflow processing that has been discussed thus far can be stored for later retrieval. This function is illustrated at step 256, wherein data can be logged for further report generation.

An array of information can be gathered, stored, and processed to provide business with data to base improvements. One key datum is the final emotional ranking assigned to a message or closed case. A case may be a series of correspondence from the customer to the company regarding a particular issue. For a case, the order in which the messages are received is important. The system and method of the present invention can account for the temporal sequence of messages. That is, the most recent email from a customer is treated as a better indicator of his or her level of satisfaction than a prior message.

For example, a user's initial message may open a case and be assigned an emotional ranking of −10. After a customer support representative (CSR) answers the question, the customer may send a response which receives a ranking of +50. The system could employ a time-scale weighted average that would weight the more recent +50 ranking more than the earlier −10 ranking, along with the aforementioned factors, to produce an overall satisfaction ranking that is in close accord to the customer's current frame of mind.

Many other metrics can be gathered including the overall language usage of the company's customer support representatives, historical pleased resolution rate, and historical degree of customer satisfaction. This data is stored and able to be recalled for generating reports. Finally, some other external action can be performed on the message as shown at step 259.

Figure 2A:
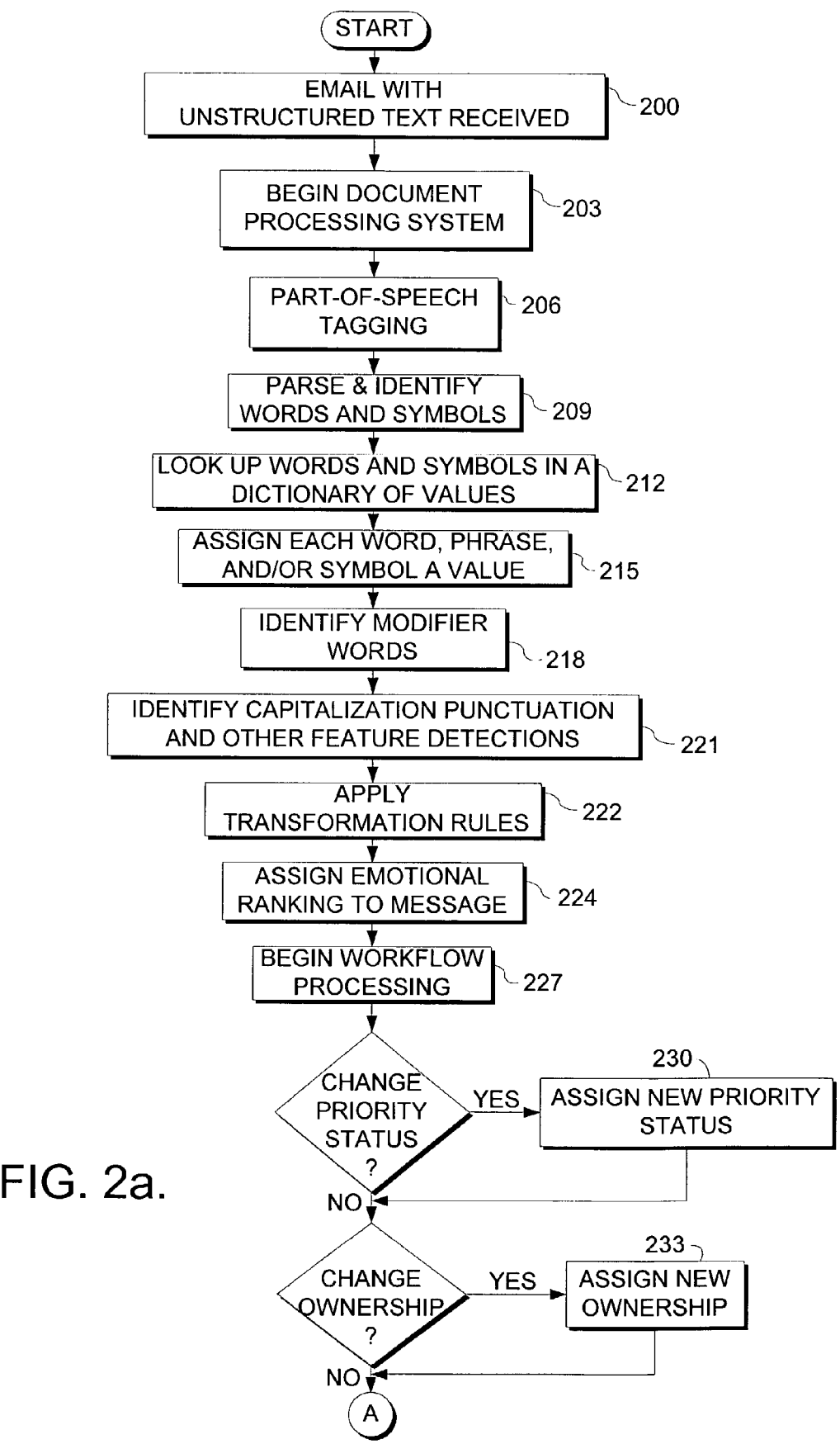
FIGS. 2*a* and 2*b* are a flow chart depicting operation of an embodiment of the present invention.
Figure 2B:
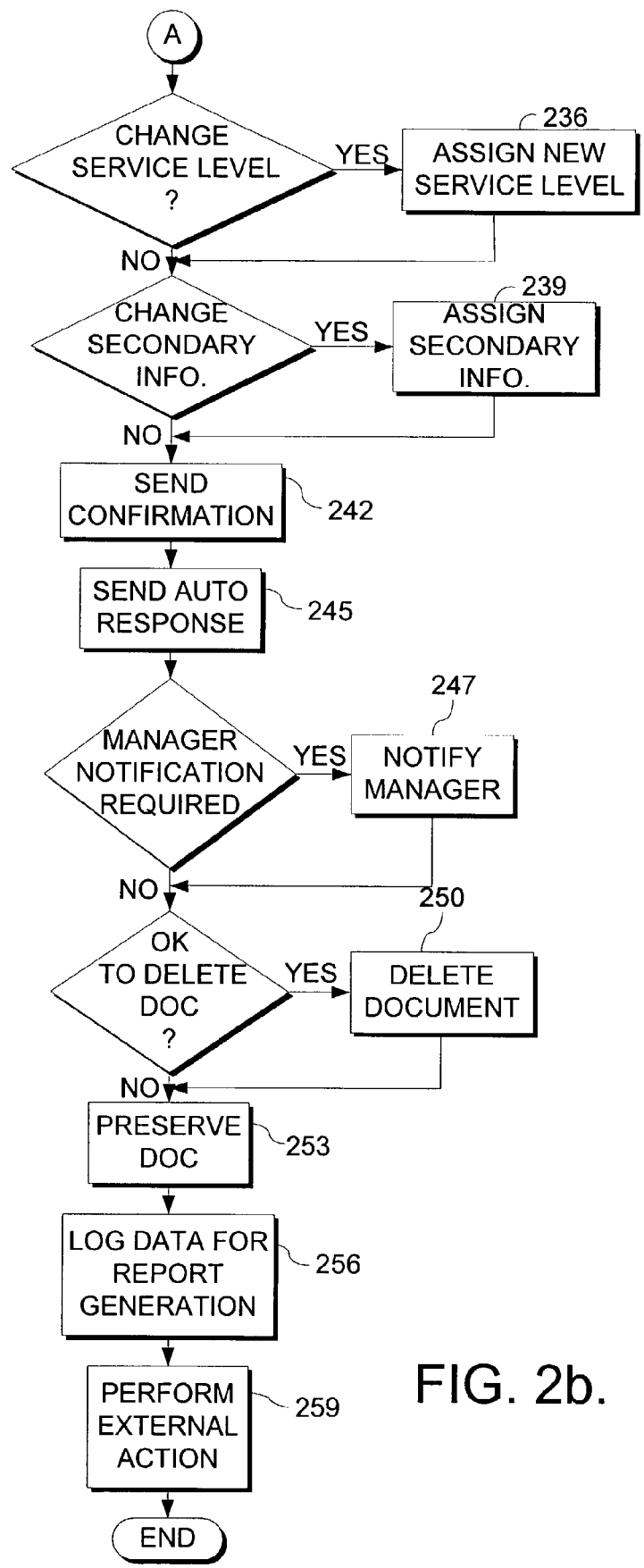

The present invention comprises multiple components and functions which have been described with reference to FIGS. 1, 2a and 2b. A block diagram illustration of an embodiment of the present invention is further presented in FIG. 3 and generally referenced at routing system 300.

Routing system 300 illustrates and groups in a pictorial manner, the functions, features and processes that are involved with the system and method of the present invention. Generally, at a high level, unstructured text 302 is piped into a document processing system 304, which then provides an output for human action 318.

Document processing system 304 provides the functions described earlier with respect to FIG. 2. System 304 comprises a text feature detection component 306 and a document manipulation component 312. The text feature detection component 306 includes both an emotion detection component 308 and an other features detection component 310. In practice, the emotion detection component 308 performs identification of key items (e.g., words and emotions), word modifiers, and punctuation or capitalization within a message.

Document manipulation component 312 includes an other document processing component 316 for processing system actions and a workflow processing component 314. The workflow processing component 314 incorporates processing such as changing the priority or status for a given message, changing ownership, changing service level or changing the secondary information pertaining to the message. In addition, workflow processing component 314 performs other types of processing such as those relating to confirmations and the automated response to messages. Other features and aspects of the present invention that relate to external actions such as notification of a manger or deletion of a document, can also be considered a part of workflow processing. In other words, all workflow rules and escalation rules associated with the present invention are provided by the workflow processing component 314.

The combination of all non-automated functions performed by the document processing system 304 is the provision of information for action by a human user. This function is illustrated as human action 318. For example, when a message is deemed by the document processing system 304 to be from an unhappy customer, the message is routed to an appropriate customer support representative for their action.

While the invention has been described with reference to the exemplary embodiments thereof, those skilled in the art will be able to make various modifications to the described embodiments of the invention without departing from the true spirit and scope of the invention. The terms and descriptions used herein are set forth by way of illustration only and are not meant as limitations. In particular, although the method of the present invention has been described by examples, the steps of the method may be performed in a different order than illustrated or simultaneously. Those skilled in the art will recognize that these and other variations are possible within the spirit and scope of the invention as defined in the following claims and their equivalents.

What the invention claimed is:

1. A method for routing electronic correspondence to personnel or entity having a potential interest in the emotional content of the words or symbols within said electronic correspondence, said method comprising:

receiving said electronic correspondence;

analyzing said electronic correspondence to determine an emotional ranking for said correspondence;

assigning an emotional value to said electronic correspondence using a reference data structure, wherein said emotional value is reflective of both positive and negative emotions;

providing a time-scaled weighting average of a plurality of emotional ranking values of said electronic correspondence, to more accurately reflect recent emotions of the originator of said electronic correspondence; and routing said electronic correspondence to one of said personnel or entity more likely having said potential interest without substantially modifying the contents thereof for further action based on said emotional ranking.

2. A method in a computing environment for routing an electronic correspondence based on the level and type of information contained within the electronic correspondence, the method comprising:

parsing said electronic correspondence;

assigning one or more values to portions of said electronic correspondence;

utilizing said one or more values to provide an emotional ranking for said electronic correspondence;

providing a time-scaled weighting average of a plurality of emotional ranking values of said electronic correspondence, to more accurately reflect recent emotions of the originator of said electronic correspondence; and routing said electronic correspondence to personnel having an interest in taking action based on said correspondence as a result of said emotional ranking without substantially modifying the contents thereof.

* * * * *